United States Patent
Chu (10) Patent No.: US 9,621,984 B1
(45) Date of Patent: Apr. 11, 2017

(54) METHODS TO PROCESS DIRECTION DATA OF AN AUDIO INPUT DEVICE USING AZIMUTH VALUES

(71) Applicant: Amazon Technologies, Inc., Seattle, WA (US)

(72) Inventor: Wai Chung Chu, San Jose, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

(21) Appl. No.: 14/883,166

(22) Filed: Oct. 14, 2015

(51) Int. Cl.
H04R 3/00 (2006.01)
H04R 1/40 (2006.01)
G10L 15/22 (2006.01)
G06F 3/16 (2006.01)
G10L 25/21 (2013.01)

(52) U.S. Cl.
CPC ............ *H04R 1/406* (2013.01); *G06F 3/165* (2013.01); *G10L 15/22* (2013.01); *G10L 25/21* (2013.01); *H04R 3/005* (2013.01); *G10L 2015/223* (2013.01); *G10L 2015/227* (2013.01)

(58) Field of Classification Search
CPC ... G10L 15/22; G10L 25/21; G10L 2015/223; G10L 2015/227
USPC ......................................................... 381/92
See application file for complete search history.

(56) References Cited

U.S. PATENT DOCUMENTS

| | | | |
|---|---|---|---|
| 8,824,699 B2 * | 9/2014 | Derkx | G01S 3/8083 381/92 |
| 2005/0049864 A1 * | 3/2005 | Kaltenmeier | G10L 15/20 704/233 |

FOREIGN PATENT DOCUMENTS

WO 2009/062211 A1 5/2009

OTHER PUBLICATIONS

Machine Translation of Nishiura et al. Japanese Publication No. 2002-091469, Mar. 27, 2002.*
Berdugo, Baruch et al. "On Direction Finding of an Emitting Source from Time Delays" undated, 33 pages.
Omochowski, Jacek et al. "Fast Steered Response Power Source Localization Using Inverse Mapping of Relative Delays" IEEE, 2008, 4 pages.
Jarrett, Daniel P. et al. "Eigenbeam-based Acoustic Source Tracking in Noisy Reverberant Environments" undated, 6 pages.

(Continued)

*Primary Examiner* — Paul S Kim
*Assistant Examiner* — Katherine Faley
(74) *Attorney, Agent, or Firm* — Brinks Gilson & Lione (57) ABSTRACT

Devices, systems, and methods provide direction finding of an acoustic signal source with respect to a voice-controlled device. The direction can be found without using elevation data, instead determining the horizontal location based on power values of the received signal. A large number of candidate vectors having values for azimuth, elevation, and power may be generated by a steered response power algorithm. The large number of vectors is reduced to a small number of reference azimuths spanning an azimuth range by associating the vectors with the closest reference azimuth and then calculating an average and/or maximum power of the associated vectors at each reference azimuth. The reference azimuth with the highest average (or maximum) power may be set as the direction of the signal source. Alternatively, each reference azimuth having an average (or maximum) power exceeding a threshold may be considered a direction of one of multiple sources.

20 Claims, 7 Drawing Sheets

(56) References Cited

OTHER PUBLICATIONS

Marković, Ivan. "Speaker Localization and Tracking with a Microphone Array on a Mobile Robot Using von Mises Distribution and Particle Filtering" undated, 13 pages.

Felisberto, Paulo et al. "Tracking Source azimuth Using a Single Vector Sensor" IEEE Computer Society, 2010, 6 pages.

\* cited by examiner

METHODS TO PROCESS DIRECTION DATA OF AN AUDIO INPUT DEVICE USING AZIMUTH VALUES

BACKGROUND

Many user devices, such as smartphones, tablet computers, laptop computers, desktop computers, and home automation devices, can be at least partially operated by voice commands and inquiries. Voice-controlled devices can monitor, record, process, and respond to speech within range of the device; typically, audio input is collected with a microphone or microphone array, and audio output is presented through one or more loudspeakers. Various input and output functions of the device benefit from locating the speech source with respect to the device. A microphone array can use beamforming techniques to focus the signal detection toward the source location. A loudspeaker that best directs the audio output toward the location can be selected from multiple differently-oriented loudspeakers. A line array or other loudspeaker array can use beam steering techniques to direct the audio output toward the location. Processing of spoken commands can depend on the source location; for example, receiving a commend to "turn on the lights," the device may determine from the source location which room the speaker is standing in, and turn on the lights for that room.

The speed and accuracy with which a voice-controlled device detects and responds to spoken commands and inquiries can be improved by optimizing the signal processing hardware and device logic to quickly and accurately determine the azimuth of the speech source with respect to the device.

BRIEF DESCRIPTION OF DRAWINGS

The detailed description is set forth with reference to the accompanying drawings. The use of the same reference numbers in different figures indicates similar or identical items or features. Various embodiments in accordance with the present disclosure will be described with reference to the drawings, in which.

DETAILED DESCRIPTION

The present disclosure provides systems, device configurations, and processes for obtaining a direction, with respect to a voice-controlled device, toward a source of an acoustic signal received by the voice-controlled device. The disclosure pertains in particular to obtaining the direction from direction data produced by a source localization algorithm. Present methods of processing the direction data can significantly reduce the time and computational overhead that would otherwise be needed to obtain the direction from the direction data with similar accuracy using conventional processing techniques. The present advantages increase with the size of the direction data set; thus, the methods work particularly well with source localization algorithms that generate large amounts of direction data with a high resolution.

Non-limiting examples of suitable source localization algorithms include standard and archival versions, as well as modern updates and variations, of cross-correlation, generalized cross-correlation (GCC), phase transform (PHAT), steered response power (SRP) and other time-difference-of-arrival (TDOA) algorithms, maximum likelihood (ML, a variant of GCC), and combinations of these (e.g., GCC-PHAT, SRP-PHAT). Such algorithms generate a large amount of data describing candidate directions, and significant time, energy, and resources can be consumed to accurately identify the direction from the candidate directions. It will be understood that the present systems, methods, and device configurations can be adapted to operate on the data generated by these and other source localization algorithms without undue experimentation. For purposes of illustration, the description below presumes the SRP algorithm is used.

The SRP algorithm is well known; SRP and variants of it are widely used in commercial devices as well as in laboratory settings for testing and research. The technical and operative details of SRP and its more robust cousin, SRP-PHAT, have been extensively evaluated in the literature, and at any rate are not relevant to the present disclosure. Suffice to say, in a multiple-microphone environment, SRP processes an audio input recorded from an acoustic signal on a sample-by-sample basis, measuring the differences in arrival times of components of the acoustic signal at the various microphones. SRP outputs tuples, referred to herein as candidate directions or candidate vectors, of form $$\{\theta_m, \phi_m, p_m\}, m=0 \text{ to } M-1$$

where: $\theta$ is the azimuth value in degrees with respect to a zero azimuth (usually front) of the device, measured in a plane that is horizontal when the device is in an upright or vertical orientation; $\phi$ is the elevation value in degrees with respect to an axis extending out of the top of the device, which axis is normal to the plane in which the azimuth is measured; p is the power value of the audio input at the azimuth and elevation of the candidate vector; and M is the size of the set of candidate vectors. The azimuth and elevation together define a direction (in spherical coordinates) relative to a location and orientation of the device; that is, for a vertical (i.e., upright) orientation of the device when the device is placed on a flat, non-inclined surface, the azimuth is the angle within a horizontal plane that contains a reference point of the microphone array (i.e., passes through the microphone array) measured from zero azimuth with respect to the device, and the elevation is the angle from the vertical axis (i.e., the axis extending out of the top of the device) measured toward the perpendicular horizontal plane. The power value may indicate the signal strength of a sound source at the direction. Additionally, the possible azimuth or elevation values may be limited by providing a minimum and maximum boundary value to the SRP algorithm.

The size M of the set of candidate vectors is always quite large to account for all or most of the space around the device (and within the azimuth and elevation limits, if any). A common size M, used herein for illustrative purposes, is 2000 candidate vectors. The directions of these vectors are uniformly or substantially uniformly distributed around the microphone array and within the azimuth and elevation ranges, if any are provided to the SRP algorithm; nevertheless, with so many candidate vectors it is common to see, for example, many candidate vectors having the same azimuth and different elevations, or approximately equal directions and widely varying power values. The data resolution is high, but there are only a small number of candidate directions that are an actual direction toward a source. All three dimensions of each vector must be evaluated, with respect to nearby candidate vectors, to determine whether the candidate direction is true. This is burdensome to the device, which can be constantly trying to locate the source(s) and consuming resources even while being spoken to. The complexity grows exponentially with larger sizes M and/or with the task of identifying multiple sources.

The present methods and device configurations improve evaluation of the direction data by reducing, ignoring, discarding, and/or not using some data in the set of candidate vectors. The methods can be applied in near- and far-field applications and can be optimized for one or the other. For example, in far-field source tracking applications, knowledge of elevation may not be important, since a user is typically located at a distance that is considered horizontal to the device. Thus, in one implementation, the direction(s) of one or more sources of an acoustic signal may be determined based only on the azimuth and power values of the candidate vectors. The elevation values may be discarded or otherwise excluded from the evaluation. The device divides the azimuth range of the set of candidate vectors with a number of reference azimuth values, which may be evenly spaced across the azimuth range. The number of reference azimuth values may be significantly less than the number of candidate vectors, differing by at least an order of magnitude in some implementations, and more specifically by two or even three orders of magnitude.

The device then associates each of the candidate vectors with the corresponding reference azimuth value that is closest in value to the azimuth value of the candidate vector (i.e., the combination produces the lowest possible difference). The result is a mapping or reduction of the candidate vectors onto a circle, or a sector of a circle, in the horizontal plane with the device at its center. The device may then produce a reference power value for each of the reference azimuth values. The reference power value represents the signal strength of the audio input in the reference azimuth direction. In one implementation, for each reference azimuth value, the device sums all of the power values of the candidate vectors associated with the reference azimuth value and divides by a count (i.e., the number) of associated candidate vectors to produce the reference power value as an average power of the candidate vectors mapped to the reference azimuth value. Additionally or alternatively, the device may determine the largest power value for all of the candidate vectors associated with the reference azimuth value. In another embodiment, the device may identify, for each reference azimuth value, all of the associated candidate vectors that have a power value above a threshold.

Subsequent processing of the reference power values and/or the mapped candidate vectors produces the directions toward one, some, or all of the acoustic signal sources. For example, the device may simply select, as the direction, the reference azimuth value with the highest average power value; or, the device may evaluate the candidate vectors associated with the reference azimuth value having the highest average power value, and identify as the direction the azimuth value of the candidate vector with the highest power level; or, the device may identify average power levels that exceed a threshold and identify the associated reference azimuth values as directions. Other processing is contemplated and/or described below.

In some other implementations, the elevation values of some or all of the candidate vectors can be used to refine the data set. For example, a home automation device may only need to track near-field sources in an elevation range of up to 60 degrees above horizontal and down to 30 degrees below horizontal. The device can remove or ignore any candidate vectors having an elevation value outside of the elevation range. In another example, the candidate vectors may be assigned to subsets associated with their respective reference azimuth values, the elevation values of candidate vectors in various subsets may be evaluated to differentiate between multiple sources at or near the same azimuth.

A voice-controlled device configured with the present direction determining processes may then use the identified directions to perform additional actions. Non-limiting examples are described above and/or include: focusing one or more beamformers or beam steerers in the identified direction(s); performing blind source separation or other signal processing of the recorded signal to identify multiple sources and their directions; cooperating with other voice-controlled devices that are responding to the source, such as by exchanging direction data to triangulate the location of the source; and, performing the direction determining processes repeatedly on different samples of an audio input to produce an array of directions representing movement of the source while the audio input was being generated. More generally, the device can use the directions to improve signal quality (e.g., signal-to-noise ratio, amplitude, etc.) of one or more audio inputs, and to deliver output more efficiently to the acoustic signal source(s).

Figure 1:
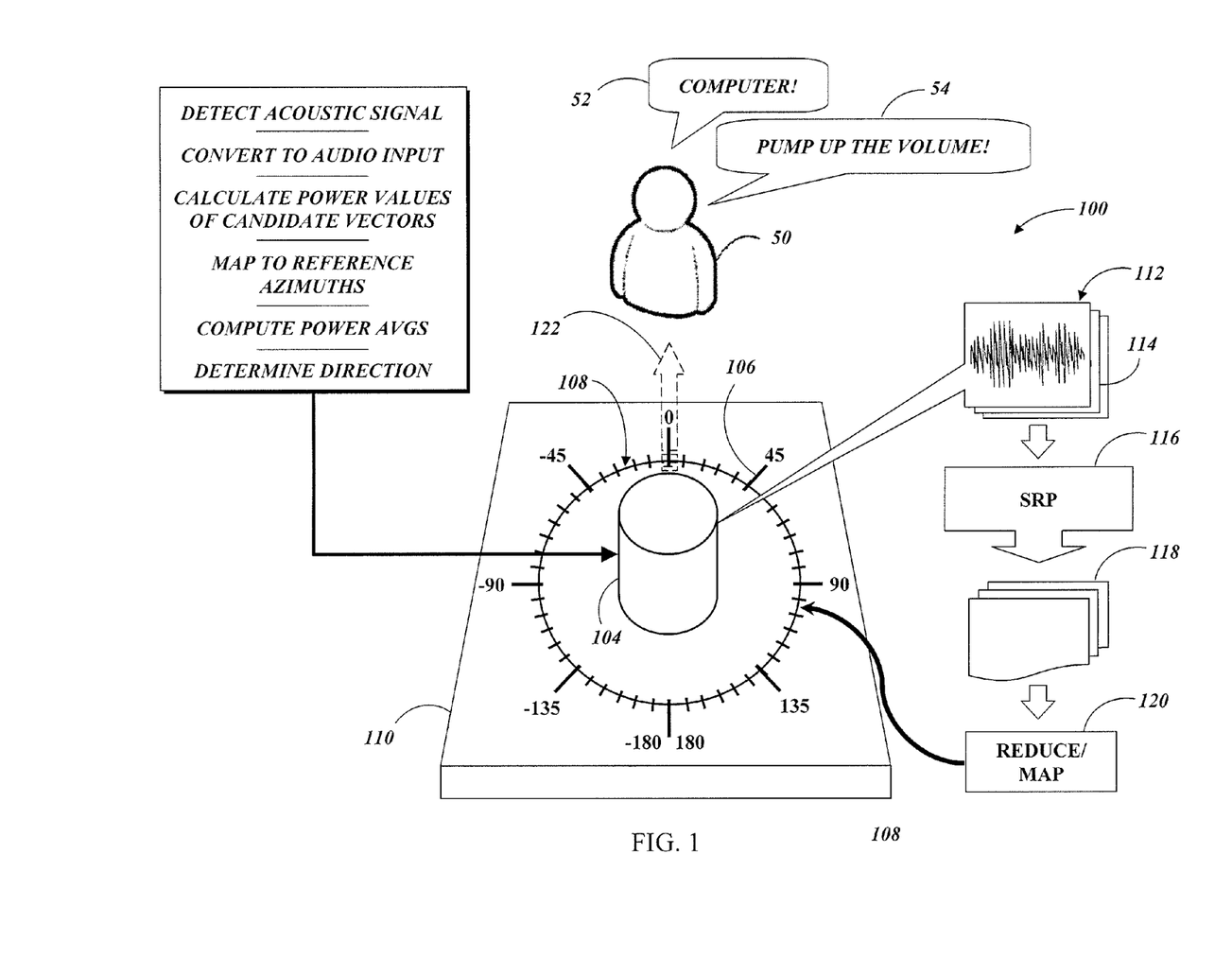
FIG. 1 is a diagram of an example system in which a voice-controlled user device processes direction data to determine a direction of an acoustic signal source.

FIG. 1 illustrates a system 100 that implements the direction determining processes. The system 100 includes at least one user device 104, which is a voice-controlled device that performs typical functions like responding to a wakeword 52, processing and/or executing a command 54, and other functions as described with respect to FIG. 2. The user device 104 may be further configured with appropriate hardware or software to perform the direction determining processes. Any voice-controlled computing device may be assembled and/or configured with the present hardware and software modules, and the disclosure contemplates home and office automation devices, personal assisting devices, mobile and non-mobile computing devices, security systems, medical facility systems, industrial automation systems, and the like, as non-limiting examples only. The user device 104 may be configured to connect to a local area network (LAN) a Wi-Fi network, a wide area network (WAN), or another communication network, and may transmit data to and receive data from other devices on any connected networks, including other user devices, an access point (AP) device, smart electronics such as thermostats and light switches, remote servers, and the like.

As shown in FIG. 1, the user device 104 may wait in a passive listening state until it detects an acoustic signal, received at a microphone array or another suitable input device. Additionally, the present processes may be continuously operating as long as new direction data can be provided for evaluation; in particular, the user device 104 may be in an operational state and actively listening to one or more sources for an extended period of time, such as when a user 50 activates a record function and then conducts a meeting to be recorded. In the illustrated example, the user device 104 detects an acoustic signal, in the case comprising the wakeword 52. The direction detection may be activated upon detection of the acoustic signal, regardless of the contents of the acoustic signal; alternatively, the user device 104 may first determine that the acoustic signal comprises the wakeword 52 and may then begin the direction detection processes.

The user device 104 may store or generate a number of reference azimuth values 106 that each represent an angle in a horizontal plane. The angle may be measured from a zero azimuth. The zero azimuth may be oriented toward the front of the device, or alternatively may be any direction programmed as the zero-reference in the user device 104, such as true north as identified by a magnetometer or compass of the device. The reference azimuth values 106 may be within an azimuth range 108 set by a minimum (i.e., lowest desired) azimuth value and a maximum (i.e., highest desired) azimuth value. The azimuth range 108 is the range over which the user device 104 will look for sources. The azimuth range 108 may be small (e.g., 30 degrees or 60 degrees wide) if the user device 104 is configured to monitor for signals in a particular direction, but the azimuth range 108 may suitably be a complete circle containing 360 degrees. In one example, the azimuth values may be measured from a minimum azimuth value of −180 to a maximum azimuth value of 180 as shown in FIG. 1, but other minimums and maximums may be used (e.g., minimum of zero and maximum of 360).

Spacing between the reference azimuth values 106 may be varied or uniform. Uniform spacing may be by a degree increment based on the azimuth range 108 and the number of reference azimuth values 106. In the illustrated example, the degree increment is equal to 360 (degrees in the azimuth range 108) divided by 48 (reference azimuth values 106), or 7.2 degrees. The number of reference azimuth values 106 may be selected depending on the width of the azimuth range 108, the spacing of azimuth values 106 (e.g., uniform or non-uniform), and the desired resolution for the direction determination process. A range of suitable numbers of reference azimuth values 106 for a complete circle with uniform spacing is from about eight (45 degree increment) to 100 (3.6 degree increment) or even more.

The user device 104 may be configured to convert the acoustic signal to an audio input 112 readable by the user device 104 and other devices, as described below. The audio input 112 may be captured (i.e., converted) at a sample rate; the audio input 112 thus comprises a sequence of samples 114, the number of samples 114 depending on the sample rate and the duration of the audio input 112. A source location algorithm 116, such as SRP, is applied by the user device 104 or another device to the audio input 112. Alternatively, the device 104 may perform additional signal processing of the audio input 112 to determine that the source location algorithm 116 only needs to be run on a subset of the samples 114 to obtain the accurate direction(s). For example, the device 104 may determine that portions of the audio input 112 are empty or contain only static, or have a signal-to-noise ratio that prevents their interpretation, and may remove the portions before applying the source location algorithm 116. The source location algorithm 116 calculates the power value of the audio input 112 at each direction represented by the candidate vectors 118 as described above or otherwise conventionally.

A source locator module 120 of the user device 104 may reduce the data embodied in the candidate vectors 118 and map the candidate vectors 118 to the reference azimuth values 106 as summarized above and/or as described in detail below. The source locator module 120 may calculate the average power values associated with the reference azimuth values 106. The user device 104 may then determine one or more directions 122 toward a source of the acoustic signal (e.g., user 50) as described herein. Subsequently, the user device 104 may perform actions related to the direction 122, such as focusing a beamformer in the direction 122 to improve the quality of the audio input when the command 54 is received.

Figure 2:
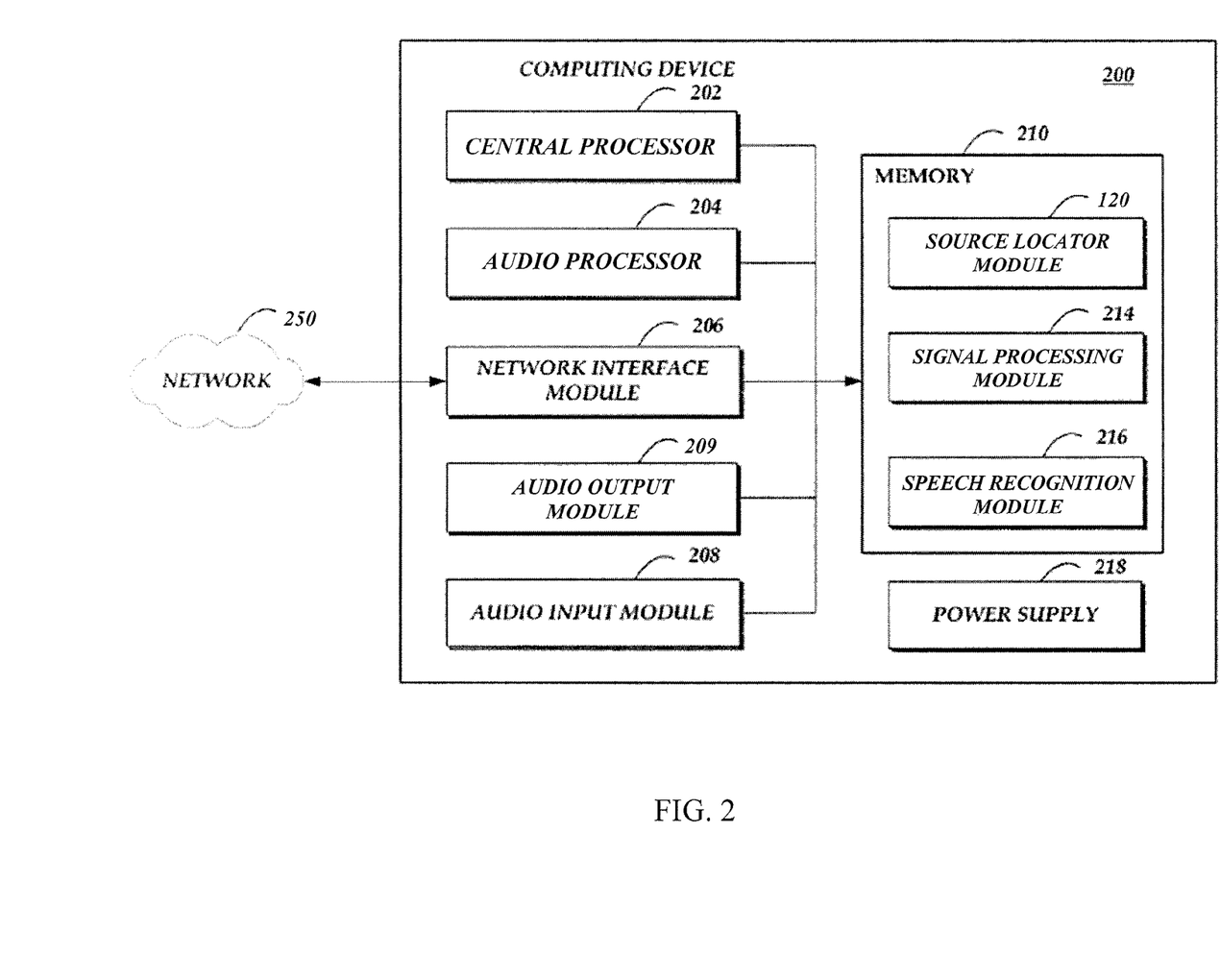
FIG. 2 is a schematic diagram of a computing device in accordance with the disclosure.

FIG. 2 illustrates a computing device 200 that can perform the present direction determining processes. The computing device 200 includes a central processor 202, an audio processor 204, a network interface module 206, an audio input module 208, an audio output module 209, and memory 210, all of which may communicate with one another by way of a communication bus. The computing device 200 may also include a power supply 218, which may provide power to the various components of the computing device 200.

The central processor 202 may include one or more microprocessors specially configured to communicate with the memory 210 to implement various software modules and associated program instructions stored therein; such modules include the source locator module 120, a signal processing module 214, and a speech recognition module 216. The memory 210 generally includes RAM, ROM, flash memory, solid state memory, and/or other persistent or non-transitory computer-readable storage media. The source locator module 120 may be stored as program instructions in memory. When executed by the central processor 202, the source locator module 120 may configure the central processor 202 to perform the direction determination processes described herein. Execution of the source locator module 120 may configure or instruct the central processor 202 to access and/or use other modules of the computing device 200, including without limitation: accessing the audio processor 204 to retrieve device-readable audio input; accessing the audio input module 208 to control one or more beamformers of the computing device 200; and executing the signal processing module 214 to obtain signal qualities of the audio input. The memory 210 may store a configurable source localization algorithm, and the source locator module 120 may execute the source localization algorithm, or may configure the central processor 202 to do so.

The memory 210 may additionally store a signal processing module 214 that provides computer program instructions for use by the central processor 202 in analyzing a recorded and/or converted audio input. The signal processing module 214 may include executable algorithms to determine the quality of the audio input. Non-limiting examples of such algorithms for obtaining quality values include calculation of the signal-to-noise ratio, frequency and/or amplitude detection, comparison to a threshold quality, automatic gain control processing, and the like. The memory 210 may additionally store a speech recognition module 216 that provides computer program instructions for use by the central processor 202 in identifying that an audio input contains speech, and/or contains particular words or phrases, such as the wakeword. The speech recognition module 216 may be any program that produces speech recognition results, such as a dictation application, a speech processor native to the operating system of the computing device 200, or an application programming interface. The memory 210 may store one or more language models for the wakeword, and the speech recognition module 216 may configure the central processor 202 to compare the audio input to the stored language model to identify the wakeword in the audio input.

The audio processor 204 may be a microprocessor or group of microprocessors, an integrated or discrete circuit, or a software-implemented module, that converts an acoustic signal received by the computing device 200, or an electrical signal representing the acoustic signal, into an audio input that is readable by the central processor 202. In one example, the audio processor 204 may be an analog-to-digital converter. The audio processor 204 may receive the signal generated by the audio input module 208 and generate the audio input therefrom. The audio input module 208 may include an audio input device, such as a microphone or array of microphones, whether analog or digital. The microphone or array of microphones may be implemented as a directional microphone or directional array of microphones. The audio input module 208 may also include mechanical and/or software/implemented controls for the microphone or array of microphones for positioning a plurality of the microphones in a phased array that accomplishes beamforming. In some embodiments, the audio input module 208 receives and records the acoustic signal and outputs the recording to the audio processor 204. The audio input module 208 may also receive instructions from the audio processor 204 to set a sampling rate (whether in sample rate or bitrate) for obtaining audio. The audio input module 208 may also (or instead) include one or more piezoelectric elements and/or micro-electrical-mechanical systems (MEMS) that can convert acoustic energy to an electrical signal for processing by the audio processor 204. The audio input module 208 may further be provided with amplifiers, rectifiers, and/or other audio processing components as desired.

The network interface module 206 may provide the computing device 200 with connectivity to one or more networks 250, such as a LAN or a wide-area network. The network interface module 206 may additionally or alternatively enable peer-to-peer connectivity directly to other devices, such as via Bluetooth or Wi-Fi Direct. The central processor 202 may send instructions and information to, and receive instructions and information from, remote computing devices that also communicate via the network 250. In some embodiments, the network interface module 206 comprises a wireless network interface that provides the computing device 200 with connectivity over one or more wireless networks.

In some embodiments, the network interface module 206 is selectively activated. While the network interface module 206 is in a deactivated or "sleeping" state, it may provide limited or no connectivity to networks or computing systems so as to conserve power. In some embodiments, the network interface module 206 is in a deactivated state by default, and becomes activated responsive to a signal from the central processor 202. While the network interface module 206 is in an activated state, it may provide a relatively greater amount of connectivity to networks or computing systems, such that the network interface module 206 enables the computing device 200 to send audio input to a remote computing device and/or receive audio input from a remote computing device or a speech recognition result from a speech recognition server, described below. In a particular, non-limiting example, the network interface module 206 may be activated responsive to the central processor 202 determining that an audio input includes a wakeword.

The audio output module 209 may be a speaker or an array of speakers, along with any requisite electronic components for converting an analog or digital signal of the computing device 200 into an acoustic signal for output by the speaker. The audio output module 209 may communicate indicators of a state of the computing device 200, such as when the computing device 200 is ready to receive a command. The audio output module 209 may output results of an input command or inquiry, once the command/inquiry is processed by the computing device 200. The audio output module 209 may also output other audio data, such as music stored in memory 210 or obtained via data stream from a remote device. The audio output module 209 may include mechanical and/or software/implemented controls for positioning a plurality of the speakers in a phased array that accomplishes beam steering to a desired direction.

One or more additional input devices such as light sensors, position sensors, image capture devices, or the like may be provided with the computing device 200. Such additional input devices are not shown in FIG. 2 so as not to obscure the principles of the present disclosure. In some embodiments, an additional input device may detect the occurrence or non-occurrence of a condition. Information pertaining to such conditions may be provided to the central processor 202 to determine whether one or more components of the computing device 200 should be activated or deactivated. In one embodiment, the additional input device includes a light sensor configured to detect a light level. In another embodiment, the additional input device includes an image capture device configured with facial recognition capabilities. Still further input devices may include, for example, user input devices such as mice, keyboards, touchscreens, and/or keypads. Likewise, output devices such as LED indicators, displays, speakers, and/or headphones, for example, may be provided.

Figure 3:
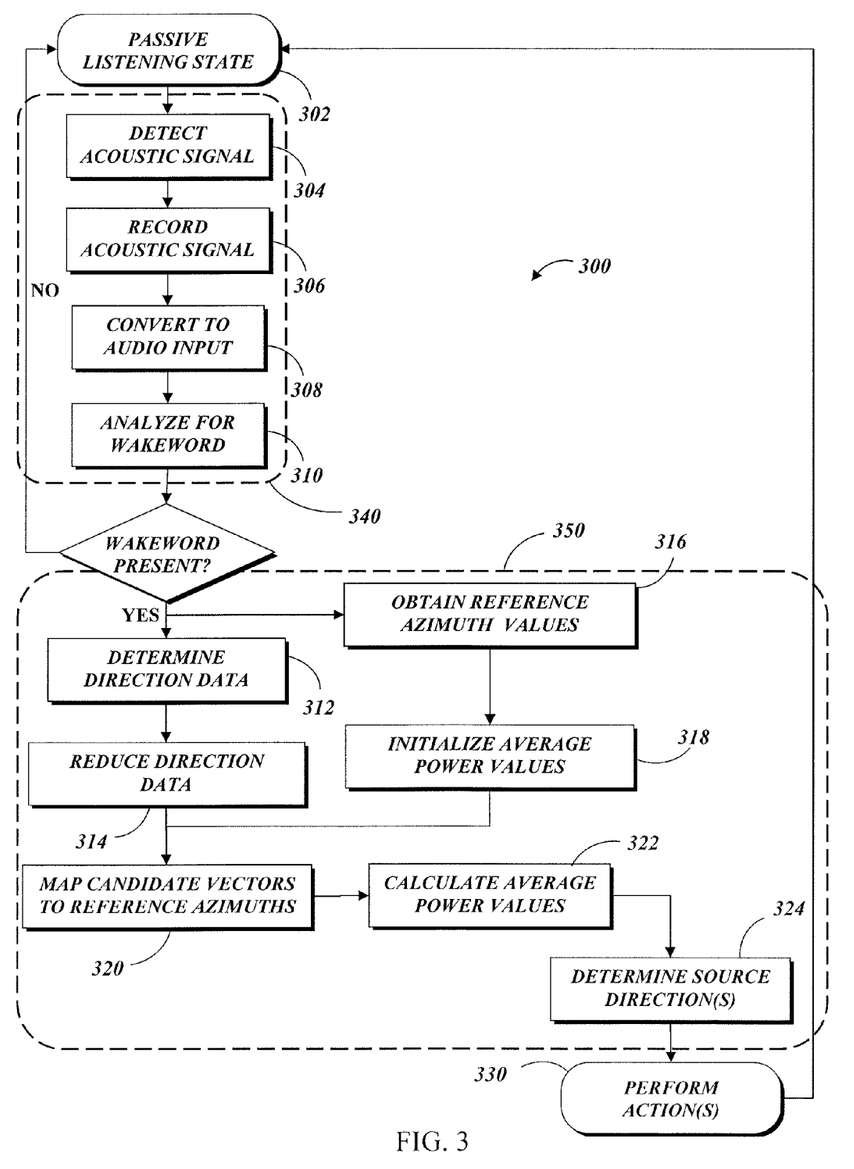
FIG. 3 is a flowchart of a method of determining the direction of acoustic signal sources.

FIG. 3 illustrates an exemplary method 300 performed by a computing device (e.g., the first user device 104 of FIG. 1 and the computing device 200 of FIG. 2) to quickly and accurately, and with low resource usage, determine a direction of an acoustic signal source relative to the computing device. Initially, the computing device may be in the passive listening state 302, wherein the computing device monitors the acoustic signals in its range but does not permanently record the acoustic signals or respond to them. The computing device may be in another device state, provided the state allows the computing device to detect and respond to the acoustic signal. For example, the steps 304, 306, 308, and 310 may cause the computing device to transition (or may result from the computing device transitioning) from the passive listening state 302 to one or more wakeword detection states 340.

At step 304, the computing device detects an acoustic signal, such as at a microphone of the computing device, and at step 306 the computing device records the acoustic signal. This may be a temporary recording, such as an output signal from the microphone, of a continuous input stream to the computing device. At step 308, the computing device converts the recording into an audio input readable by the computing device, if necessary. The audio input may include only the wakeword, additionally or alternatively may include audio data occurring before the wakeword was spoken, and additionally or alternatively may include audio data occurring after the wakeword was spoken, such as the input command or inquiry. At step 310, the computing device analyzes the audio input, such as by applying speech recognition algorithms, to determine if the wakeword is present in the audio input. If the wakeword is not present, the computing device returns to the passive listening state 302 and continues passively analyzing the input stream. Alternatively to step 310, and regardless of whether the audio input comprises the wakeword, the computing device may transition to a direction detection state 350 and may follow step 308 with step 312.

If at step 310 the wakeword is present in the audio input, the computing device may transition to the direction detection state 350. At step 312, the computing device may obtain, compute, or otherwise determine a set of candidate vectors containing direction data of the audio input. In one embodiment, the computing device may apply a steered response power (SRP) algorithm to the audio input to determine the candidate vectors, each having a corresponding azimuth value, elevation value, and power value. The computing device may pass minimum and maximum azimuth values to the SRP algorithm, such that the azimuth values of the resulting candidate vectors are in the azimuth range between the minimum and maximum.

At step 314, the computing device may optionally reduce the direction data by removing, deleting, excluding, or ignoring candidate vectors or corresponding values that the computing device will not use to determine the direction. In some embodiments, the computing device may discard any candidate vectors that are out-of-range vectors due to their elevation values being outside of a desired elevation range. In some embodiments, the computing device may discard or ignore the elevation values completely. Other examples of reducing the direction data are described herein.

Before, concurrently with, or subsequent to the steps described above, the computing device may, at step 316, obtain a number of reference azimuth values within the azimuth range. The reference azimuth values may be uniformly spaced apart, and the values themselves may begin at the minimum azimuth value and increase by a degree increment up to the maximum azimuth value, the degree increment being equal to the azimuth range divided by the number of reference azimuth values. At step 318, the computing device may generate and/or initialize (i.e., set values to zero) a set of average power values, and may associate each average power value with a different one of the reference azimuth values. The average power values may be initially set to zero for comparison purposes, in case one or the reference azimuth values is an "empty set" (i.e., no candidate vectors are mapped to it).

At step 320, the computing device may map the candidate vectors to the reference azimuth values in the horizontal plane. In some implementations, the computing device may associate each candidate vector with the corresponding reference azimuth value that is the closest to the azimuth value of the candidate vector. In some implementations, the reference azimuth values may be stored in an indexed array, and the index of the closest reference azimuth value may be determined with a mathematical operation, such as a modulus of the candidate vector's azimuth value with the degree increment.

In some implementations, the computing device may identify, as a plurality of first candidate vectors, the candidate vectors having azimuth values that differ from a first of the reference azimuth values by less than half of the degree increment. Thus, for example, for 36 reference azimuth values spaced 10 degrees apart, the computing device will identify, for the reference azimuth value of 20 degrees, all candidate vectors having an azimuth value greater than 15 and less than 25 as first candidate vectors. Further, to account for azimuth values that differ from the first reference value by exactly half of the degree increment, the computing device may "round up" by identifying the candidate vector as a first candidate vector if the corresponding azimuth value is less than the first reference azimuth value. The computing device may associate the first candidate vectors with the first reference azimuth value, and may repeat the process for the other reference azimuth values.

After step 320, some or all of the reference azimuth values have candidate vectors associated with them. At step 322, the computing device may then calculate the average power value associated with each reference azimuth value, by taking the average of the power values of the candidate vectors associated therewith. In some implementations, the power value may be a numerical value or other discrete data point, and the computing device may add together all of the power values and then divide that sum by a count of the candidate vectors. Alternatively, the computing device may calculate the average power values (step 322) on a rolling basis as the candidate vectors are mapped (step 320). For example, the computing device may update a summed power value and a count for each reference azimuth value when another candidate vectors is mapped to the reference azimuth value. Additionally or alternatively, the device may perform one or more suitable peak signal processing methods to identify power values. For example, the device may discern between sources of relevant data, such as speech, in the acoustic signal, and sources of noise in the acoustic signal, by first identifying a peak amplitude of the signal at a particular direction (i.e., for a particular candidate vector, or for a set of candidate vectors associated with a reference azimuth value). The device may then determine the width of the peak, such as by setting boundary thresholds at a fraction (e.g., 1/2) of the peak amplitude and determine the distance (i.e., amount of time) from the peak amplitude that the amplitude drops below the boundary threshold on either side or both sides of the peak. The device may then determine a ratio of the peak amplitude to the peak width, and determine from that ratio whether the peak is sharp enough to be considered a speech source.

At step 324, the computing device may use the average power values to determine one or more directions toward one or more sources. In the situation illustrated in FIG. 1, the computing device may simply determine that a first average power value is greater than the other average power values, and identify the first average power value's associated reference azimuth value. The computing device may then determine that the direction toward the source of the acoustic signal is offset from zero degrees azimuth by the first reference azimuth value, which is zero; thus, the direction is zero degrees azimuth. Alternatively, once the computing device identifies the reference azimuth value, the computing device may identify the associated candidate vector with the highest power value, and may set the direction as offset from zero degrees azimuth by the azimuth value of the identified candidate vector, which in this case would be greater than or equal to negative-five and less than five.

In situations where multiple acoustic signal sources and potential noise sources are located around the computing device, the computing device may identify all of the acoustic signal sources and disregard the noise source using the present processes. In one implementation, the computing device can compare the average power values to a threshold value; if the average power value is above the threshold value, the computing device will identify it as related to a signal source. The computing device may then identify the reference azimuth values associated with the average power values that exceeded the threshold, and determine that the direction to each signal source is offset from zero degrees azimuth by the corresponding reference azimuth value.

In another implementation for discerning multiple sources, the computing device may at step 324 identify a first source using one of the "highest average power value" methods. Then, the computing device may use the highest average power value as a benchmark, setting a threshold value at the highest average power value multiplied by a scalar that is less than one (e.g., 0.9). Similar average power values to the highest average power value will exceed the threshold, and the computing device may identify the corresponding reference azimuth values and determine that the direction to each signal source is offset from zero degrees azimuth by the corresponding reference azimuth value.

Another situation is contemplated, in which there are potentially two or more signal sources at the same or a similar azimuth and different elevations. To discern these signal sources, the computing device may use the elevation data of two or more of the candidate vectors. Thus, assuming the elevation data for the candidate vectors was not discarded or can be retrieved, step 324 may include further evaluating the subset of candidate vectors associated with a particular reference azimuth value where at least one source is located (i.e., the average power value is the highest or exceeds a threshold as described above). The computing device may identify a first peak vector from the subset of candidate vectors, the power value of the first peak vector being greater than the power values of the other candidate vectors in the subset. This first peak vector, having the maximum power value of its subset, is directed at a source; the computing device may determine that the direction for the source is offset from zero degrees azimuth by the particular reference azimuth value (or by the azimuth value of the first peak vector), and further is offset from horizontal by the elevation value of the first peak vector.

Then, the computing device may identify a second peak vector from the subset, the second peak vector having a power value greater than a threshold as described above, and either or both of an azimuth value differing from the azimuth value of the first peak vector, and an elevation value differing from the elevation value of the first peak vector. The azimuth and/or elevation values of the two peak vectors may differ by at least a threshold amount. In some embodiments, there may be no advantage to identifying the two different sources when there is not a minimal difference in direction between them; thus, the threshold amount may be a minimal offset, in degrees, to justify identifying a second source at the second peak vector. The minimal offset may depend on various factors, including the distance between the microphones, the sampling frequency, and the relative positioning of the microphones Additionally or alternatively, the threshold may depend on the power value of the first peak vector. If the power level is very high, the first source may be very close to the computing device, or may simply be so loud as to dominate the audio input. In that case, the threshold may be a higher value, forcing the second source to be far enough away from the first source that the computing device can hear them both clearly.

If the second peak vector satisfies the thresholds, the computing device may determine that the direction toward the second source is offset from zero degrees azimuth by the azimuth value of the second peak vectors (or by the particular reference azimuth value), and further is offset from horizontal by the elevation value of the second peak vector.

At step 330, the computing device may perform one or more actions related to the identified directions. Actions may include manipulation of computing device components (e.g., control and focusing of beamformers in the identified directions), manipulation of computing device data or other device data, interactions with one or more of the acoustic signal sources, interactions with other devices, internet searching, speech and other signal processing, and the like. Additionally, a first action with respect to a first direction may depend on the computing device re-executing or otherwise repeating the direction determining process (i.e., of the direction determining state 350 of FIG. 3) on new data.

Figure 4:
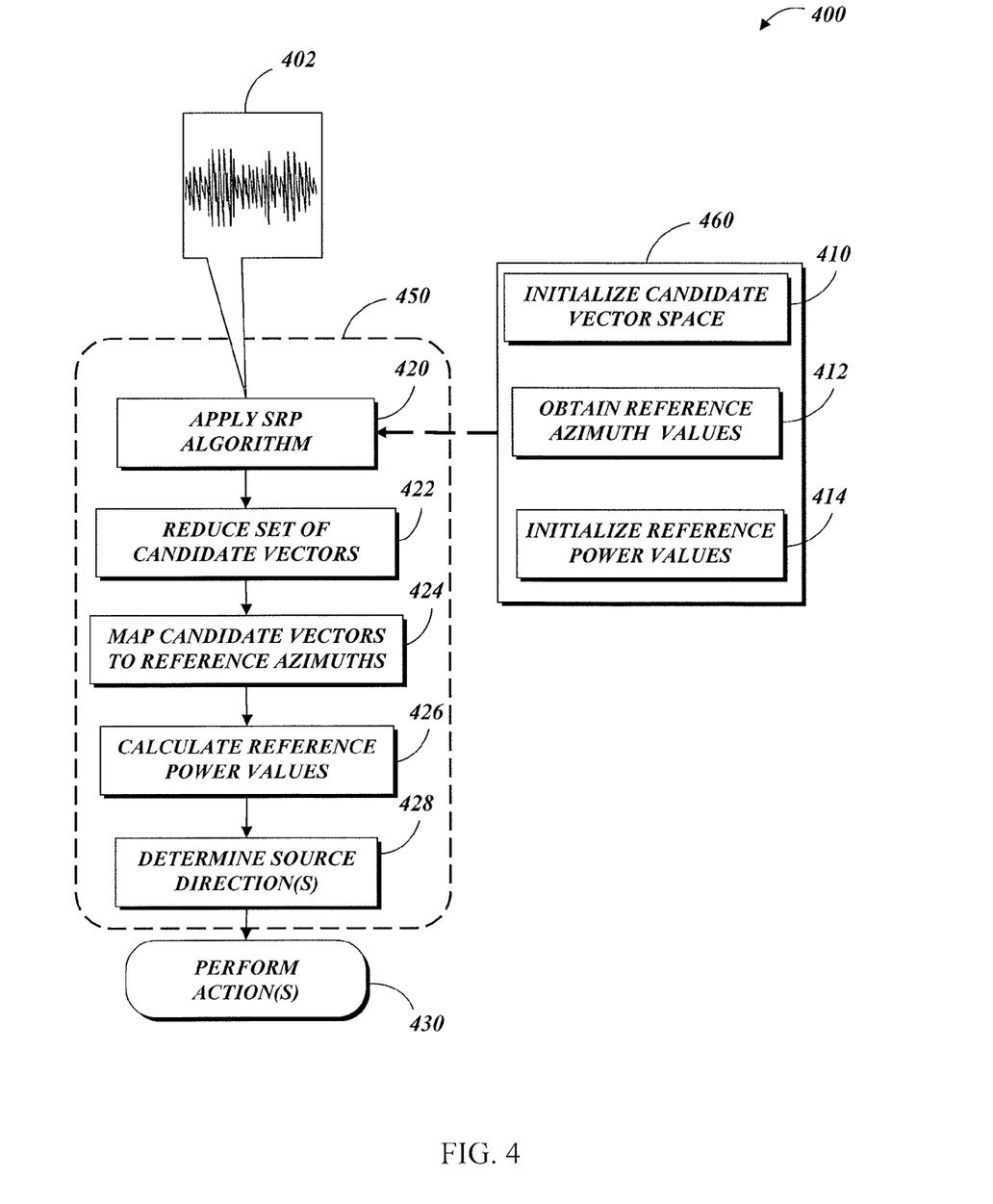
FIG. 4 is a flowchart of another method of determining the direction of acoustic signal sources.

FIG. 4 illustrates another exemplary method 400 for determining source directions of an acoustic signal represented by an audio input 402 of a computing device. A preliminary memory-loading state 460 may prepare the computing device to perform the processes of a direction determining state 450. This simplifies execution of the direction detection process by reducing the calculations to be performed during runtime of the direction detection state 450. At step 410, the computing device may initialize a candidate vector space in device memory. This may include generating and storing a desired M number of candidate vectors, each having an azimuth value, an elevation value, and a power value. Each of the values may be initialized with a value of zero; alternatively, the computing device may divide the azimuth and elevation ranges (which may default to a maximum of 360 degrees azimuth and 180 degrees elevation, or may be smaller predetermined ranges) according to the number M to obtain the azimuth and elevation values, and may store a pair of azimuth and elevation values in each candidate vector.

At step 412, the computing device may obtain the reference azimuth values, as described above with respect to step 316, and may store the reference azimuth values (e.g., as an indexed array) in memory. Similarly, at step 414 the computing device may initialize the set of reference power values associated with the reference azimuth values, as described above with respect to step 318, and may store the initialized values (e.g., as an indexed array) in memory. The computing device may then wait to detect an acoustic signal.

Upon receipt of the audio input 402, the computing device may enter the direction detection state 450 and, at step 420, may apply an SRP algorithm to the audio input 402 using all or some of the candidate vectors from the initialized candidate vector space. The SRP algorithm may use only the candidate vectors that fall into azimuth and/or elevation ranges provided by the computing device to the SRP algorithm. If the candidate vectors were initialized with azimuth and elevation values, at step 420 the SRP algorithm may simply calculate the power values for each candidate vector as described above. At step 422, the computing device may reduce the set of candidate vectors by eliminating unneeded data generated by the SRP algorithm. This may include discarding or ignoring candidate vectors falling outside of a desired elevation range or having a power value below a minimum power threshold, discarding elevation data as described above, or performing other suitable data reduction.

At step 424, the computing device may associate each remaining candidate vector with a corresponding reference azimuth value, as described above with respect to step 320. At step 426, the computing device may calculate the reference power values for each of the reference azimuth values, based on the power values of the candidate vectors associated with the reference azimuth value. In some implementations, the reference power value may be the average power, calculated as described above with respect to step 322. In other implementations, the computing device may set the reference power value equal to the highest power value of the corresponding power values of the candidate vectors associated with the reference azimuth value. At step 428, the computing device may determine the reference azimuth value(s), and in some implementations also the elevation value(s), that identify the direction of each source of the acoustic signal, as described above with respect to step 324. At step 430, the computing device may use the identified direction(s) to perform an action related to the acoustic signal.

Figure 5:
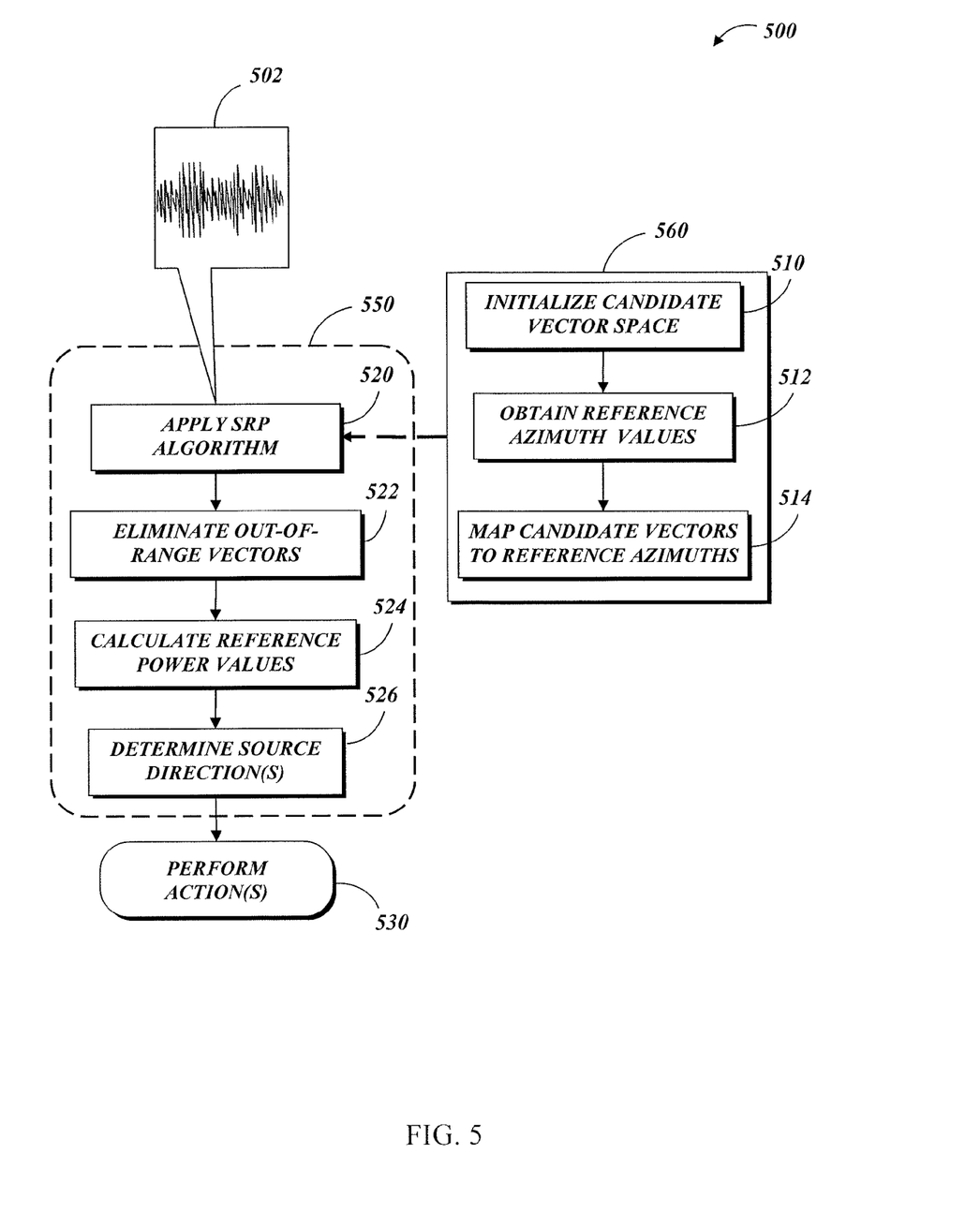
FIG. 5 is a flowchart of yet another method of determining the direction of acoustic signal sources.

FIG. 5 illustrates another exemplary method 500 for determining source directions of an acoustic signal represented by an audio input 502 of a computing device. A preliminary memory-loading state 560 may prepare the computing device to perform the processes of a direction determining state 550. At step 510, the computing device may initialize a candidate vector space in device memory, as described above with respect to step 410. At step 512, the computing device may obtain the reference azimuth values, as described above with respect to step 412. At step 514, when the candidate vectors are initialized with azimuth values, the computing device may associate the candidate vectors with the reference azimuth values, and may store the candidate vector mapping to the reference azimuth values in memory. Thus, the candidate vector association does not have to be performed during runtime of the direction detection state 550. In one example, the candidate vector space may include an index of the candidate vectors, and the candidate vectors may be mapped in advance by storing the index value of each associated candidate vector as an element in an array associated with the corresponding reference azimuth value. For each reference azimuth value, a count of the candidate vectors associated with the reference azimuth value may also be stored. The computing device may then wait to detect an acoustic signal.

Upon receipt of the audio input 502, the computing device may enter the direction detection state 550 and, at step 520, may apply an SRP algorithm to the audio input 502, as described above with respect to step 420, to produce the power values for the candidate vectors. At step 522, the computing device may eliminate candidate vectors that are outside of a desired elevation range, and may further perform other suitable data reduction. With the candidate vectors already mapped to the reference azimuth values, at step 524 the computing device may calculate the reference power values for the reference azimuth values. For each reference azimuth value, the computing device may identify, from the stored candidate vector mapping, the candidate vectors associated with the reference azimuth value, and may collect the power values for the corresponding candidate vectors. The computing device may further read the count from memory to verify that all power values have been collected, and to calculate the average power value in some implementations. The computing device may otherwise determine the reference power value as described above with respect to step 426. At step 526, the computing device may determine the source directions as described above with respect to step 428, and at step 530 the computing device may use the identified direction(s) to perform an action related to the acoustic signal.

Figure 6:
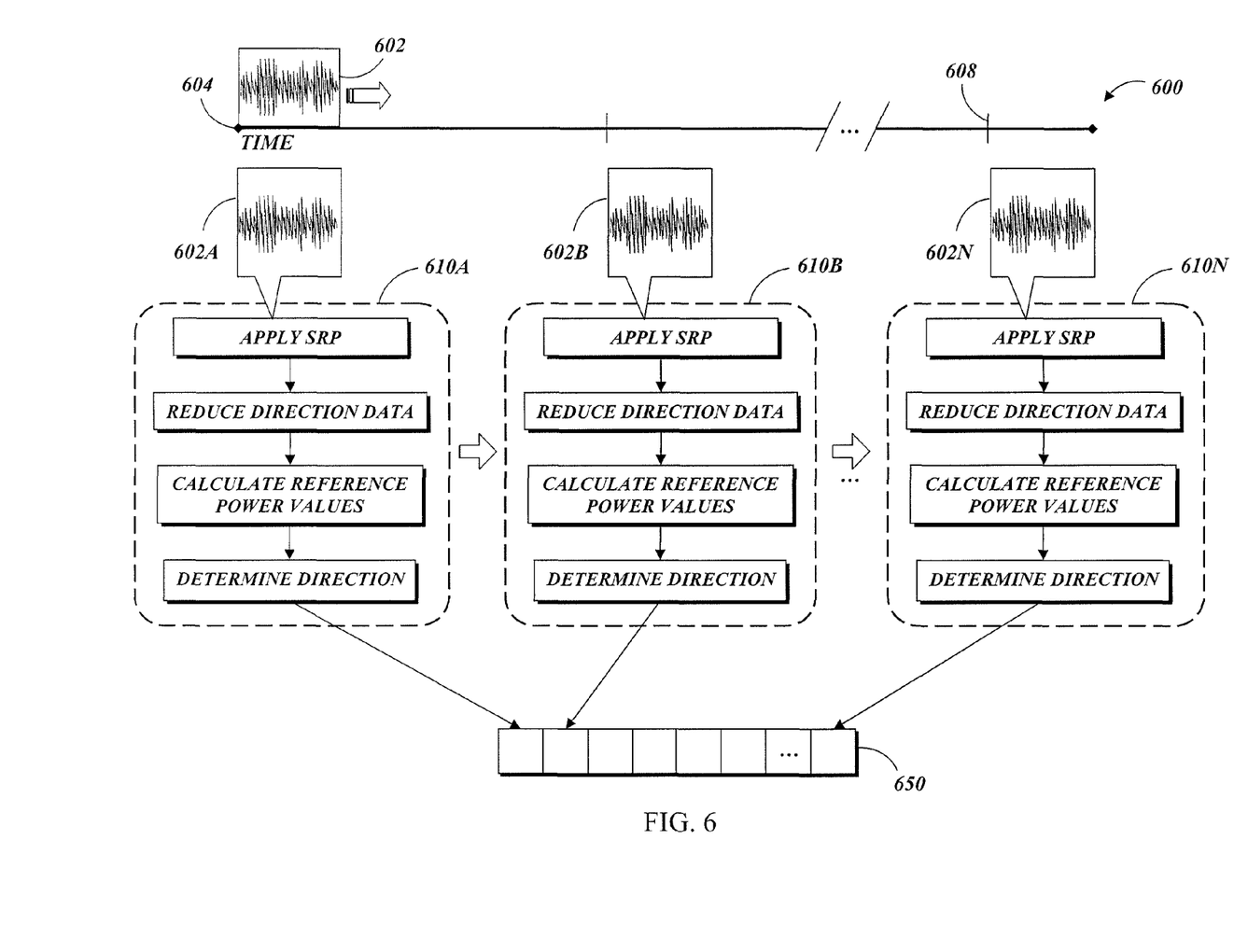
FIG. 6 is a flowchart and timing diagram of a method of tracking a signal source with a direction determination method in accordance with the present disclosure.

FIG. 6 illustrates a method 600 for determining direction of an acoustic signal that is received at the input device over a time period and converted into an audio input that is divided into a plurality of samples according to a sample rate. In the illustrated example, an audio input 602 represents the acoustic signal over a time period starting at time T=0 (point 604) and ending at time T=END (indicated by the last sample collected at point 608). The audio input 602 has a sample rate R and is divided into N sequential samples 602A, 602B, . . . , 602N, where N=R*END. The computing device may advantageously identify the source's direction in each sample 602A-N by performing the steps of a direction determining state 610A, 610B, . . . , 610N for each sample 602A-N. The direction determining state 610A-N may be any direction determining state described above, or combinations thereof, and the computing device may perform any suitable memory-loading state described above in advance. The direction determining state 610A-N may uniformly apply the steps to determine direction to the direction data of each sample; in some implementations, therefore, the only data that changes between direction determining states 610A-N of the samples may be the power values calculated by the SRP algorithm.

The candidate vectors representing each sample 602A-N are essentially subsets of an overall set of candidate vectors that represents the audio input across the time period. In this manner, the source direction of the audio input may be recalculated at every sample. Further, the computing device may store the direction of each sample at incrementing element indexes in a direction array 650. For example, the computing device may store the reference azimuth value of the determined direction in the direction array 650, or may store the index value of the reference azimuth value. In this manner, the direction array 650 tracks movement of the source over the time period, via the azimuths in the direction array 650. This information may be used by the computing device to, for example, estimate a trajectory of the source, determine a destination or a location of the source, evaluate a command received in the acoustic signal according to the source's location, and perform other direction and movement-related actions.

Figure 7:
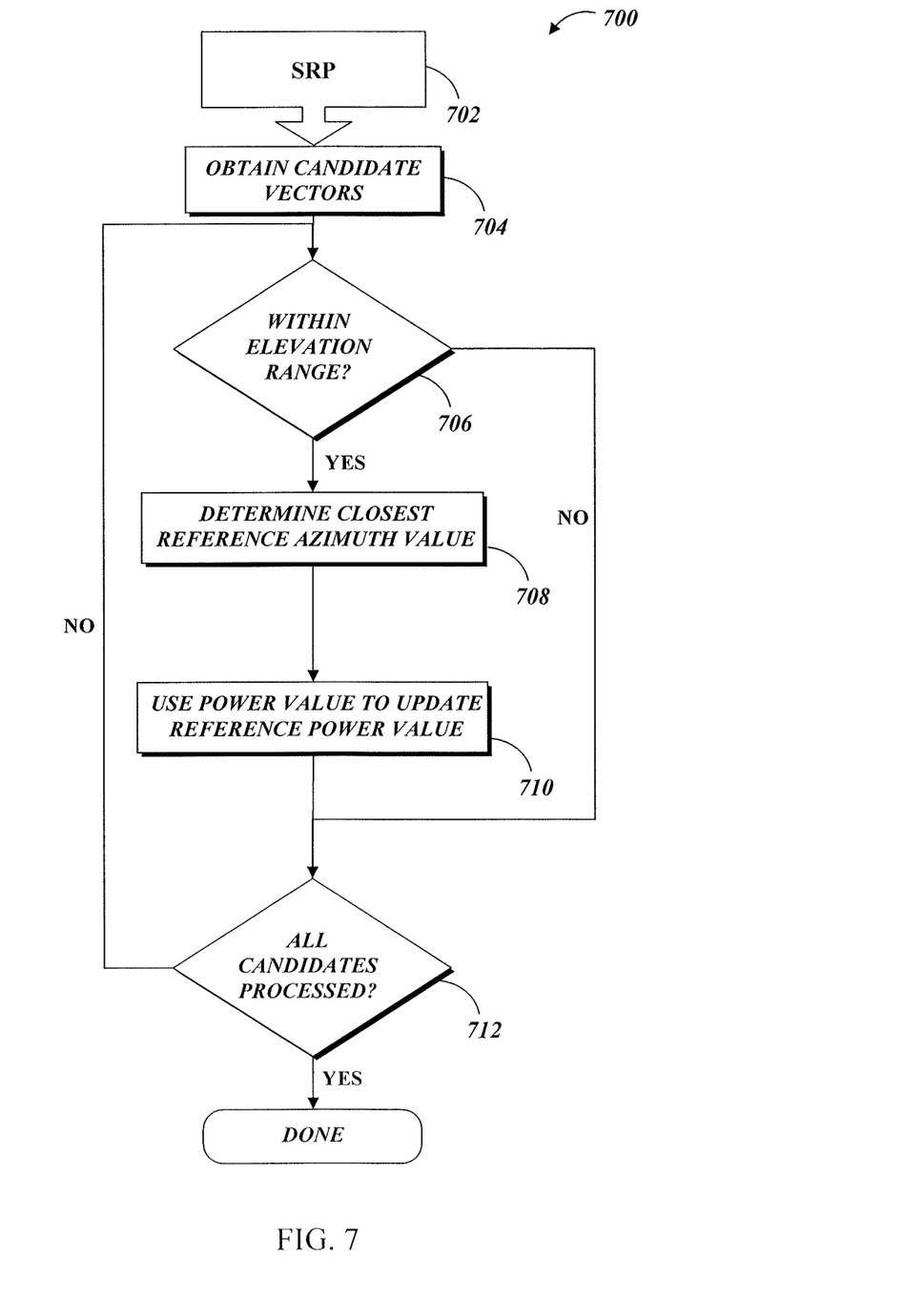
FIG. 7 is a flowchart of a method of processing a candidate vector.

FIG. 7 illustrates an exemplary method 700 that may be implemented by various direction determining methods described above to process each candidate vector, subsequent to populating the candidate vector with the values generated by the SRP algorithm 702 or another algorithm. At step 704, the computing device obtains the candidate vectors from the SRP algorithm 702, each candidate vector having corresponding azimuth, elevation, and power values. Then, for each candidate vector, the computing device: at step 706, determines whether the elevation value is within a desired elevation range, and skips steps 708 and 710 if not; at step 708, determines the azimuth reference value that is closest to the azimuth value of the candidate vector; and at step 710, incorporates the power value of the candidate vector into the calculation of the reference power value for the corresponding (i.e., closest) reference azimuth value. The method 700 may use average power values, and the computing device may increment the count for the corresponding reference azimuth value and then add the power value to the running total power value of the corresponding reference azimuth value, which is divided by the count to obtain the average power once all candidate vectors are processed. Or, the method 700 may use maximum power values, and the computing device may set the current reference power value for the corresponding reference azimuth value equal to the power value if the power value is greater. At step 712, the computing device may determine if any candidate vectors remain to be processed, and may select the next candidate vector and return to step 706 if so. If all candidate vectors have been processed, the method 700 may terminate.

The various embodiments described herein can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

What is claimed is:

1. A computing device comprising:
   a microphone array;
   a processor that converts an acoustic input received by the microphone array into an audio signal; and memory storing:
   program instructions;
   a first number of reference azimuth values, wherein each reference azimuth value of the first number of reference azimuth values that is greater than a lowest azimuth value of the reference azimuth values differs from an immediately preceding reference azimuth value of the first number of reference azimuth values, by a degree increment equal to 360 divided by the first number; and
   a plurality of candidate vectors each having a corresponding azimuth value and a corresponding elevation value, the plurality of candidate vectors numbering at least an order of magnitude greater than the first number;
   the computing device executing the program instructions to:
   generate a second number of average power values, the second number equal to the first number, wherein each average power value of the second number of average power values is initially zero and is associated with a corresponding reference azimuth value of the first number of reference azimuth values;

apply a steered response power (SRP) algorithm to the audio signal to calculate, for each candidate vector of the plurality of candidate vectors, a corresponding power value of the candidate vector, the corresponding power value representing the acoustic input at the corresponding azimuth value and the corresponding elevation value of the candidate vector;

determine a first candidate vector from the plurality of candidate vectors, the first candidate vector having a first azimuth value and a first power value, wherein the first azimuth value differs from a first reference azimuth value of the first number of reference azimuth values by less than half of the degree increment;

determine a second candidate vector from the plurality of candidate vectors, the second candidate vector having a second azimuth value and a second power value, wherein the second azimuth value differs from the first reference azimuth value by less than half of the degree increment;

determine a first average power value of the second number of average power values, the first average power value comprising an average of the first power value and the second power value, the first average power value being associated with the first reference azimuth value;

determine that the first average power value is greater than each other average power value of the first number of average power values;

determine that the first reference azimuth value represents, in degrees measured from zero degrees azimuth of the computing device and in a plane perpendicular to a vertical orientation of the computing device, a first direction of a first source of the acoustic input; and modify a first phase shift of the microphone array to focus the microphone array in the first direction.

2. The computing device of claim 1, wherein:
the memory further stores an elevation range between a first elevation value and a second elevation value; and
the computing device executes the program instructions to:
determine a third candidate vector from the plurality of candidate vectors, the third candidate vector having a third elevation value that is outside of the elevation range; and
discard the third candidate vector.

3. The computing device of claim 1, wherein the computing device further executes the program instructions to:
determine a third candidate vector from the plurality of candidate vectors, the third candidate vector having a third azimuth value and a third power value, wherein the third azimuth value differs from a second reference azimuth value of the first number of reference azimuth values by less than half of the degree increment;
determine a fourth candidate vector from the plurality of candidate vectors, the fourth candidate vector having a fourth azimuth value and a fourth power value, wherein the fourth azimuth value differs from the second reference azimuth value by less than half of the degree increment;
determine a second average power value of the second number of average power values, the second average power value comprising an average of the third power value and the fourth power value, the second average power value being associated with the second reference azimuth value;

determine that the second average power value is greater than a threshold value comprising the first average power value multiplied by a scalar that is less than one;
determine that the second reference azimuth value represents, in degrees measured from zero degrees azimuth of the computing device and in the plane, a second direction of a second source of the acoustic input; and
modify a second phase shift of the microphone array to focus the microphone array in the second direction.

4. The computing device of claim 1, wherein the computing device further executes the program instructions to:
before executing the program instructions to perform a first action related to the acoustic input:
determine that the first power value is greater than the second power value; and
determine that a first elevation value of the first candidate vector further represents the first direction in degrees measured vertically from a horizontal plane passing through the microphone array;
determine that the second power value is greater than a first threshold value comprising the first power value multiplied by a scalar that is less than one;
determine that a second elevation value of the second candidate vector differs from the first elevation value by at least a second threshold value that is proportional to the first power value;
determine that a second direction of a second source of the acoustic input is represented by (i) the first reference azimuth value, in degrees measured from zero degrees azimuth of the computing device and in a plane perpendicular to a vertical orientation of the computing device, and (ii) the second elevation value, in degrees measured vertically from the plane; and
modify a second phase shift of the microphone array to focus the microphone array in the second direction.

5. A computing device comprising:
an input device;
one or more processors communicatively coupled to the input device; and
memory storing program instructions, the one or more processors executing the program instructions to:
obtain a plurality of candidate vectors representing an acoustic input received at the input device, each candidate vector of the plurality of candidate vectors having a corresponding azimuth value and a corresponding power value;
associate each candidate vector from the plurality of candidate vectors with a corresponding reference azimuth value, of a plurality of reference azimuth values, that is the closest, of the plurality of reference azimuth values, to the corresponding azimuth value of the candidate vector;
determine a first reference power value of a plurality of reference power values from the corresponding power values of the candidate vectors associated with a first reference azimuth value of the plurality of reference azimuth values;
determine that the first reference power value is greater than each other reference power value of the plurality of reference power values; and
determine that the first reference azimuth value represents, in degrees measured from zero degrees azimuth of the computing device and in a plane perpendicular to a vertical orientation of the computing device, a first direction toward a first source of the acoustic input.

6. The computing device of claim 5, wherein, to determine the first reference power value, the computing device executes the program instructions to calculate an average of the corresponding power values of the candidate vectors associated with the first reference azimuth value.

7. The computing device of claim 5, wherein, to determine the first reference power value, the computing device executes the program instructions to set the first reference power value equal to a first power value of the power values corresponding to the candidate vectors associated with the first reference azimuth value, the first power value being greater than each other power value of the corresponding power values of the candidate vectors associated with the first reference azimuth value.

8. The computing device of claim 5, wherein:
the plurality of reference azimuth values are uniformly separated within an azimuth range by a degree increment; and
to associate a first candidate vector of the plurality of candidate vectors with the first reference azimuth value, the one or more processors further execute the program instructions to determine that a first azimuth value of the first candidate vector differs from the first reference azimuth value by less than half of the degree increment.

9. The computing device of claim 8, wherein the azimuth range is 360 degrees and the plurality of reference azimuths represent equally-spaced points on a circle disposed in the plane and centered on the computing device.

10. The computing device of claim 5, wherein:
to obtain the plurality of candidate vectors, the one or more processors execute the program instructions to apply a source localization algorithm to the acoustic input;
each candidate vector of the plurality of candidate vectors further comprises a corresponding elevation value calculated by the source localization algorithm; and
the one or more processors do not use the elevation data when executing the program instructions.

11. The computing device of claim 5, wherein:
each candidate vector of the plurality of candidate vectors further has a corresponding elevation value within an elevation range; and
to obtain the plurality of candidate vectors, the one or more processors execute the program instructions to discard an out-of-range vector representing the acoustic input and having an elevation value outside of the elevation range.

12. The computing device of claim 5, wherein the computing device further executes the program instructions to:
determine a second reference power value, of the plurality of reference power values, from the corresponding power values of the candidate vectors associated with a second reference azimuth value of the plurality of azimuth values;
determine that the second reference power value exceeds a threshold value; and
determine that the second reference azimuth value of the plurality of reference azimuth values represents, in degrees measured from zero degrees azimuth of the computing device, a second direction of a second source of the acoustic input.

13. The computing device of claim 12, wherein:
the input device comprises a microphone array; and
the one or more processors execute the program instructions to:
control a first beamformer implemented with the microphone array and focus the first beamformer in the first direction; and control a second beamformer implemented with the microphone array and focus the second beamformer in the second direction.

14. The computing device of claim 5, wherein:
the acoustic input is received at the input device over a time period, and is divided into a plurality of samples spanning the time period;
the plurality of candidate vectors are divided into a plurality of subsets equal in number to the plurality of samples, each subset representing a corresponding sample of the plurality of samples;
the computing device executes the program instructions to store the first direction in a direction array; and
the computing device executes the program instructions for each sample of the plurality of samples;
the direction array tracking movement of the first source over the time period.

15. A method, comprising:
obtaining a plurality of candidate vectors representing an acoustic input, each candidate vector of the plurality of candidate vectors having a corresponding azimuth value and a corresponding power value;
determining that a first azimuth value of a first candidate vector of the plurality of candidate vectors is closest, out of a plurality of reference azimuth values, to a first reference azimuth value of the plurality of reference azimuth values;
determining that a second azimuth value of a second candidate vector of the plurality of candidate vectors is closest, out of the plurality of reference azimuth values, to the first reference azimuth value of the plurality of reference azimuth values;
calculating an average of a first power value of the first candidate vector with a second power value of the second candidate vector to produce a first average power value associated with the first reference azimuth value;
determining that the first average power value is greater than a corresponding average power value of each other reference azimuth value of the plurality of reference azimuth values;
determining that the first reference azimuth value of the plurality of reference azimuth values represents, in degrees measured from zero degrees azimuth of the computing device, a first direction of a first source of the acoustic input; and
using the first direction to perform a first action related to the acoustic input.

16. The method of claim 15, wherein the plurality of candidate vectors each further have a corresponding elevation value, and obtaining the plurality of candidate vectors comprises applying a steered response power (SRP) algorithm to the acoustic input to calculate the corresponding power values and the corresponding elevation values of the plurality of candidate vectors.

17. The method of claim 16, wherein obtaining the plurality of candidate vectors further comprises:
determining that an additional elevation value of an additional vector representing the acoustic input, the additional elevation value calculated by the SRP algorithm, is outside of a desired elevation range; and
excluding the additional vector from the plurality of candidate vectors.

18. The method of claim 16, wherein obtaining the plurality of candidate vectors further comprises:

determining that the corresponding elevation value of each candidate vector in the plurality of candidate vectors is within a desired elevation range; and subsequent to determining that the corresponding elevation value of each candidate vector in the plurality of candidate vectors is within the desired elevation range, discarding the corresponding elevation value.

19. The method of claim 15, further comprising:

determining that a third azimuth value of a third candidate vector of the plurality of candidate vectors is closest, out of the plurality of reference azimuth values, to a second reference azimuth value of the plurality of reference azimuth values;

determining that a fourth azimuth value of a fourth candidate vector of the plurality of candidate vectors is closest, out of the plurality of reference azimuth values, to the second reference azimuth value of the plurality of reference azimuth values;

calculating an average of a third power value of the third candidate vector with a fourth power value of the fourth candidate vector to produce a second average power value associated with the second reference azimuth value;

determining that the second average power value is greater than a threshold value;

determining that the second reference azimuth value of the plurality of reference azimuth values represents, in degrees measured from zero degrees azimuth of the computing device, a second direction of a second source of the acoustic input; and using the second direction to perform a second action related to the acoustic input.

20. The method of claim 19, wherein:

the first action comprises directing a first beamformer of a microphone array in the first direction; and the second action comprises directing a second beamformer of the microphone array in the second direction.

* * * * *